(12) United States Patent
Hadano

(10) Patent No.: US 8,982,387 B2
(45) Date of Patent: Mar. 17, 2015

(54) INFORMATION PROCESSING APPARATUS, CONTROL METHOD THEREOF AND COMPUTER-READABLE MEDIUM

(75) Inventor: Masahiro Hadano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/370,945

(22) Filed: Feb. 10, 2012

(65) Prior Publication Data

US 2012/0229846 A1 Sep. 13, 2012

(30) Foreign Application Priority Data

Mar. 9, 2011 (JP) .................................. 2011-052120

(51) Int. Cl.
  *G06F 3/12* (2006.01)
  *G06F 15/16* (2006.01)
(52) U.S. Cl.
  CPC ............ *G06F 3/1203* (2013.01); *G06F 3/1226* (2013.01); *G06F 3/1285* (2013.01); *G06F 3/1225* (2013.01); *G06F 3/1287* (2013.01); *G06F 3/1288* (2013.01)
  USPC ......................................... 358/1.15; 709/208
(58) Field of Classification Search
  USPC ......................................... 358/1.15; 709/208
  See application file for complete search history.

(56) References Cited

U.S. PATENT DOCUMENTS

| 2002/0078160 A1* | 6/2002 | Kemp et al. .................... 709/208 |
| 2006/0221384 A1* | 10/2006 | Tanaka .......................... 358/1.15 |
| 2008/0074698 A1* | 3/2008 | Richter et al. ................. 358/1.15 |
| 2008/0144076 A1* | 6/2008 | Boliek et al. .................. 358/1.15 |

FOREIGN PATENT DOCUMENTS

| JP | 2007-334890 A | 12/2007 |
| JP | 2008-099067 A | 4/2008 |
| JP | 2010-079575 A | 4/2010 |

OTHER PUBLICATIONS

Fukazawa, JP 2008-099067.*
Japanese Office Action issued in corresponding application No. 2011-052120 on Dec. 22, 2014.

* cited by examiner

*Primary Examiner* — Marivelisse Santiago Cordero
*Assistant Examiner* — Temitayo Folayan
(74) *Attorney, Agent, or Firm* — Carter, DeLuca, Farrell & Schmidt, LLP

(57) ABSTRACT

An information processing apparatus that is connectable via a network to a print server and a printer having at least one print function of local printing and printing mediated by the print server, comprises: a search unit configured to search for a printer connected to the network; a determination unit configured to determine whether a printer detected by the search unit has both the print functions of local printing and print server-mediated printing; and a display unit configured to display, for each print function, a printer determined by the determination unit to have both the print functions.

8 Claims, 12 Drawing Sheets

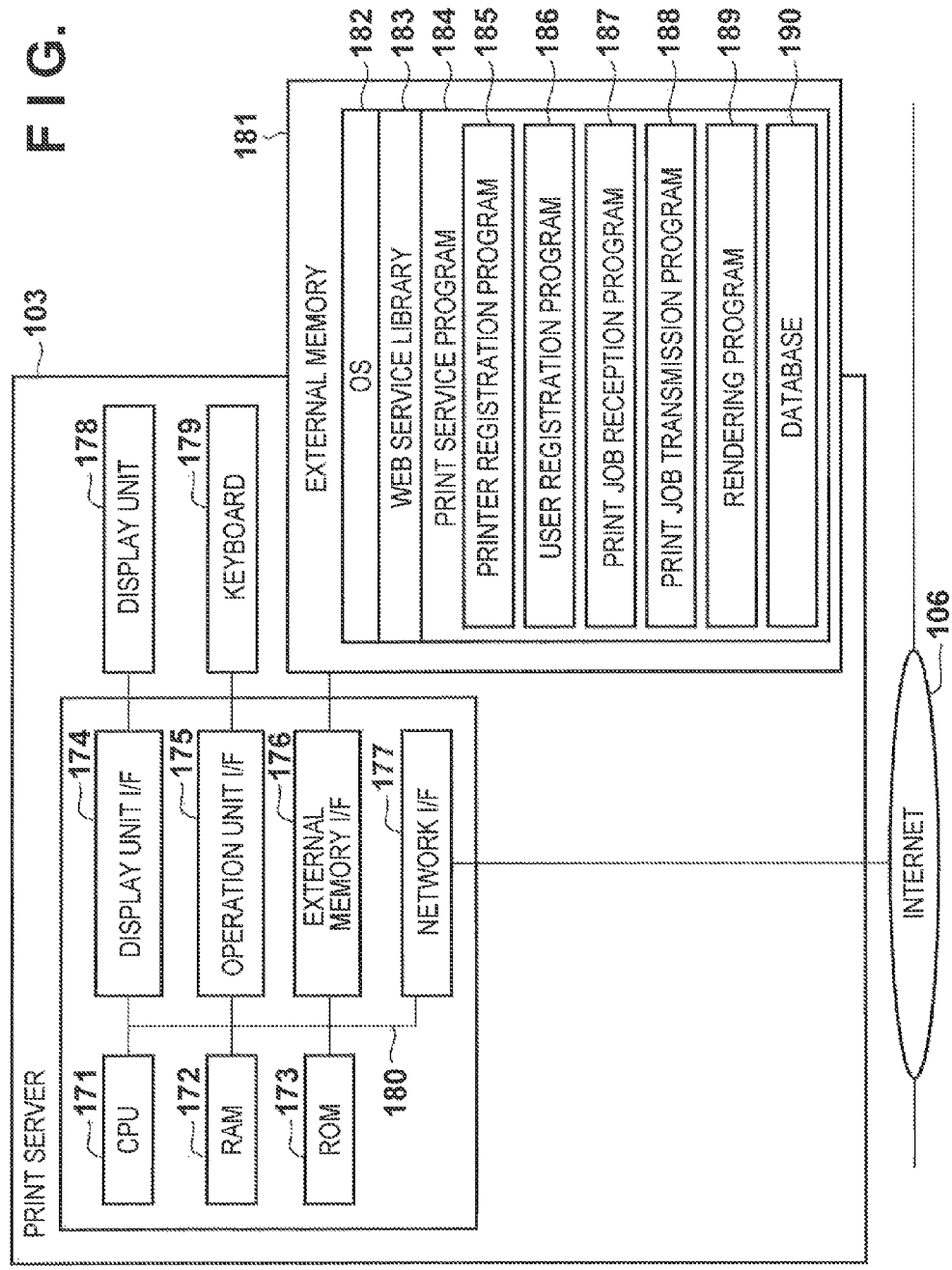

FIG. 5A

| | | |
|---|---|---|
| 501 | PRINTER NAME | PRINTER A |
| 502 | IP ADDRESS | 192.168.0.123 |
| 503 | LOCAL PRINT FUNCTION | YES |
| 504 | LOCAL PRINT STATE | ACTIVE |
| 505 | PRINT SERVICE FUNCTION | YES |
| 506 | PRINT SERVICE STATE | ACTIVE |

FIG. 5B

| | | |
|---|---|---|
| 511 | COMMUNICABILITY | COMMUNICABLE |
| 512 | PRINTER REGISTRATION STATUS | |
| | PRINTER A | REGISTERED |
| | PRINTER B | UNREGISTERED |

FIG. 5C

| | | |
|---|---|---|
| 521 | PRINTER OPERATING STATUS | OPERATING |
| 522 | PRINT SERVICE FUNCTION | ACTIVE |
| 523 | COMMUNICATION STATUS WITH SERVER | COMMUNICABLE |

FIG. 5D

PRINTER SPECIFICATION INFORMATION

| | | |
|---|---|---|
| 531 | PRINTER NAME | PRINTER A |
| 532 | IP ADDRESS | 192.168.0.123 |

DOCUMENT/IMAGE TO BE PRINTED

| | | |
|---|---|---|
| 533 | DOCUMENT NAME | ABC.txt |

JOB TICKET

| | | |
|---|---|---|
| 534 | TICKET ID | a1b2c3d4 |

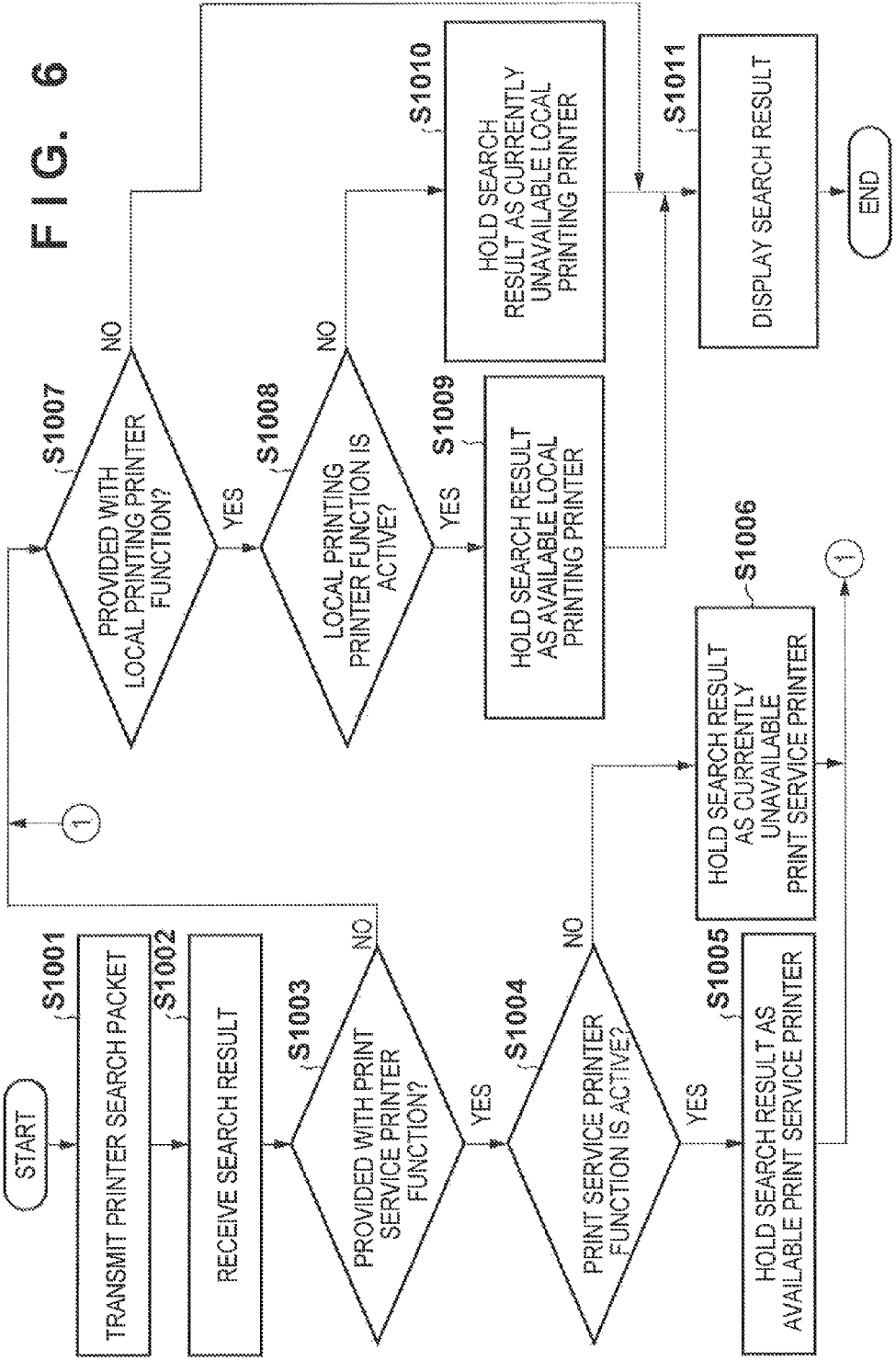

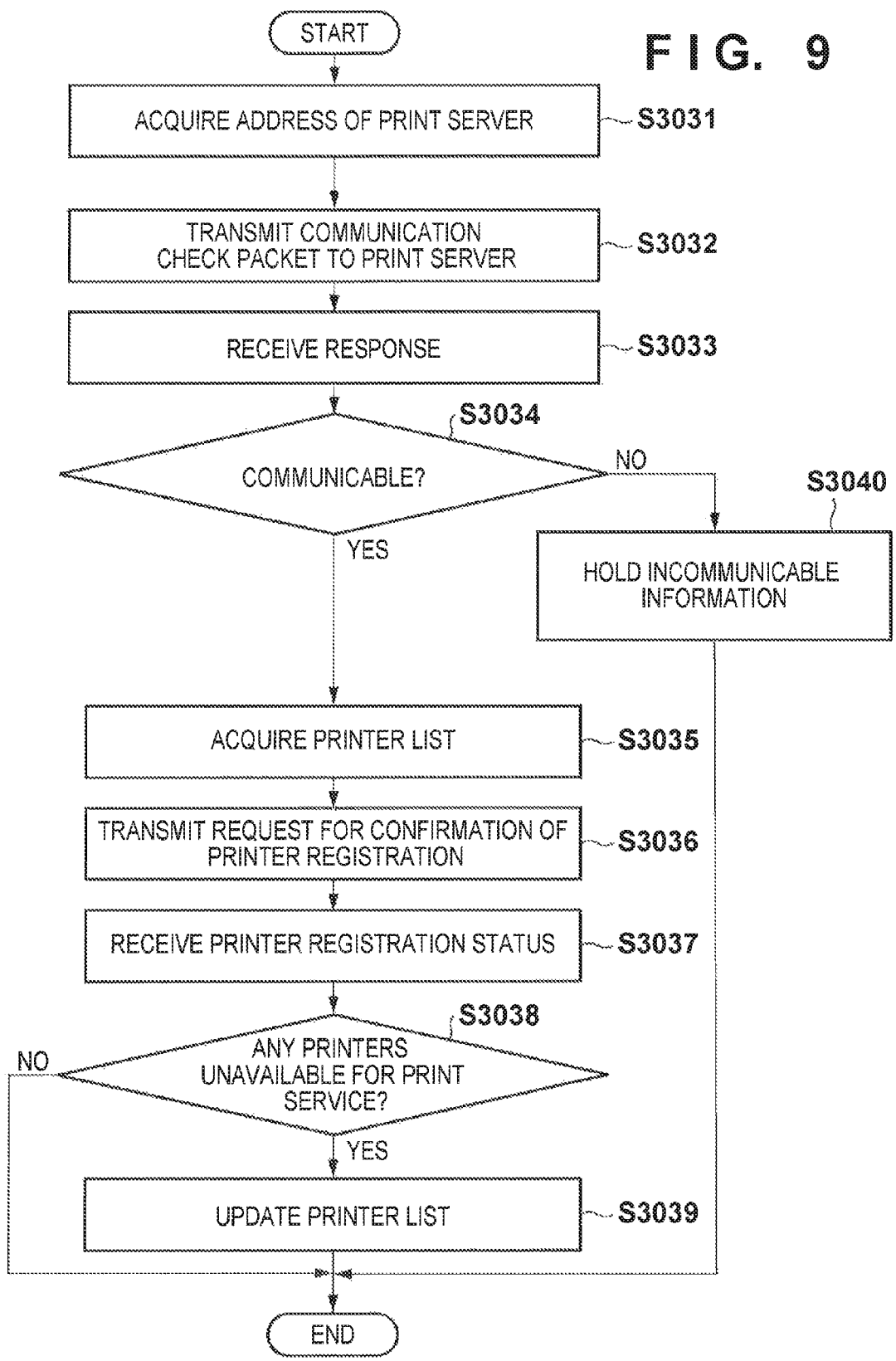

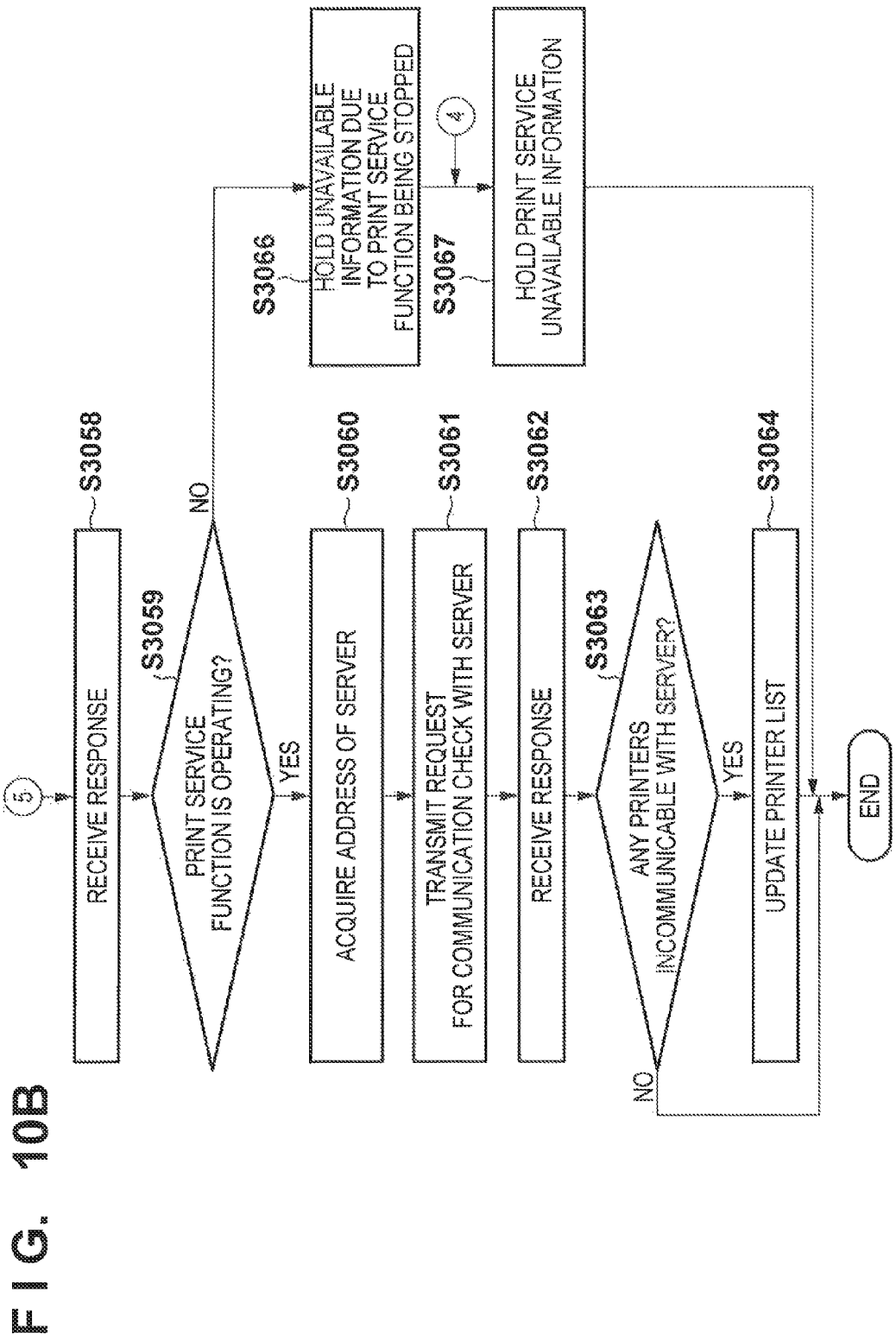

INFORMATION PROCESSING APPARATUS, CONTROL METHOD THEREOF AND COMPUTER-READABLE MEDIUM

BACKGROUND OF THE INVENTION

1. Field of the Invention

The present invention relates to a control method for detecting a printer that supports printing via a print server on the Internet, and using the detected printer distinctly from local printing.

2. Description of the Related Art

There are methods of acquiring attributes from a conventional printer that involve the printer returns attribute data including one or more attribute values in response to a request from, an agent, and the agent registering the printer in a printer manager based on received, attribute data (e.g., Japanese Patent Laid-Open No. 2007-334890). There is also a mechanism called WSD (Web Services on Devices) serving as a technology for acquiring device information.

Also, a known method of installing a printer driver involves a client apparatus searching for printers on a network, and a driver supporting a printer selected by a user from detected printers being installed on the client apparatus. At this time, the installed driver is provided by a printer management server, printer, or the like. In the case of printing a document opened with an application, the user then selects an output destination printer from among printers supported by drivers installed on the client apparatus, and instructs printing. This method is mainly used for printing in a local environment.

Meanwhile, printers that support printing via a print server on the Internet have emerged. With printing via a print server (hereinafter, print service), the user transmits information on a document and an output destination printer and, where necessary, a job ticket to a print server. When printing via a print server, the client apparatus need only have installed one driver for issuing a service request supporting the print server.

However, with Japanese Patent Laid-open No. 2007-334890, for example, the processing method of the agent is not clear in the case where one printer responds as a printer supporting a plurality of printing methods. Also, in the WSD search, the client apparatus, in the case where a printer returns a plurality of pieces (N pieces) of function information such as fax, scanner and print information, is capable of displaying an icon (N icons) for each function of the printer. However, the ability of the client apparatus to perform processing such as displaying a plurality of icons in relation to one piece of function information of the printer or associating different processing with the plurality of icons displayed in relation to the one print function is not established.

In the case of using a printer that supports printing via a print server such as mentioned above, a driver for printing via the print server and a driver for local printing are needed. Even in the case where a printer indicates, in response to a request from the client apparatus, that it is provided with only a print function, the method by which the client apparatus presents the printer to the user needs to be changed depending on whether the printer is print service-enabled or local print-enabled. However, this method is not fully established.

SUMMARY OF THE INVENTION

According to one aspect of the present invention, there is provided an information processing apparatus that is connectable via a network to a print server and a printer having at least one print function of local printing and printing mediated by the print server, comprising: a search unit configured to search for a printer connected to the network; a determination unit configured to determine whether a printer detected by the search unit has both the print functions of local printing and print server-mediated printing; and a display unit configured to display, for each print function, a printer determined by the determination unit to have both the print functions.

According to another aspect of the present invention, there is provided a control method of an information processing apparatus that is connectable via a network to a print server and a printer having at least one print function of local printing and printing mediated by the print server, comprising the steps of: searching for a printer connected to the network; determining whether a printer detected in the search step has both the print functions of local printing and print server-printing; and displaying, for each print function, a printer determined in the determination step to have both the print functions.

According to another aspect of the present invention, there is provided a computer-readable medium storing a program for causing a computer to function as: a search unit configured to search for a printer connected to a network; a determination unit configured to determine whether a printer detected by the search unit has both print functions of local printing and printing mediated by a print server; and a display unit configured to display, for each print function, a printer determined by the determination unit to have both the print functions.

According to the present invention, in the case where one printer has a plurality of print functions, the printer is presented to the user in an easily identifiable display configuration for each of the functions, enabling the user to use the printer based on this display.

Also, when a user utilizes the print service, print service printers that are actually able to realize the print service are clearly indicated to the user, enabling the user to use these printers.

Further features of the present invention will become apparent from the following description of exemplary embodiments (with reference to the attached drawings).

BRIEF DESCRIPTION OF THE DRAWINGS

FIG. 3 is a block diagram showing an exemplary configuration of a print server constituting the printing system.

FIGS. 5A, 5B, 5C, and 5B are diagrams showing exemplary configurations of data communicated by the printing system.

FIG. 6 is a flowchart showing the processing of a search program.

FIG. 9 is a flowchart showing the processing of the print service driver.

FIGS. 10A and 10B are flowcharts showing the processing of the print service driver.

DESCRIPTION OF THE EMBODIMENTS

System Configuration

Figure 1:
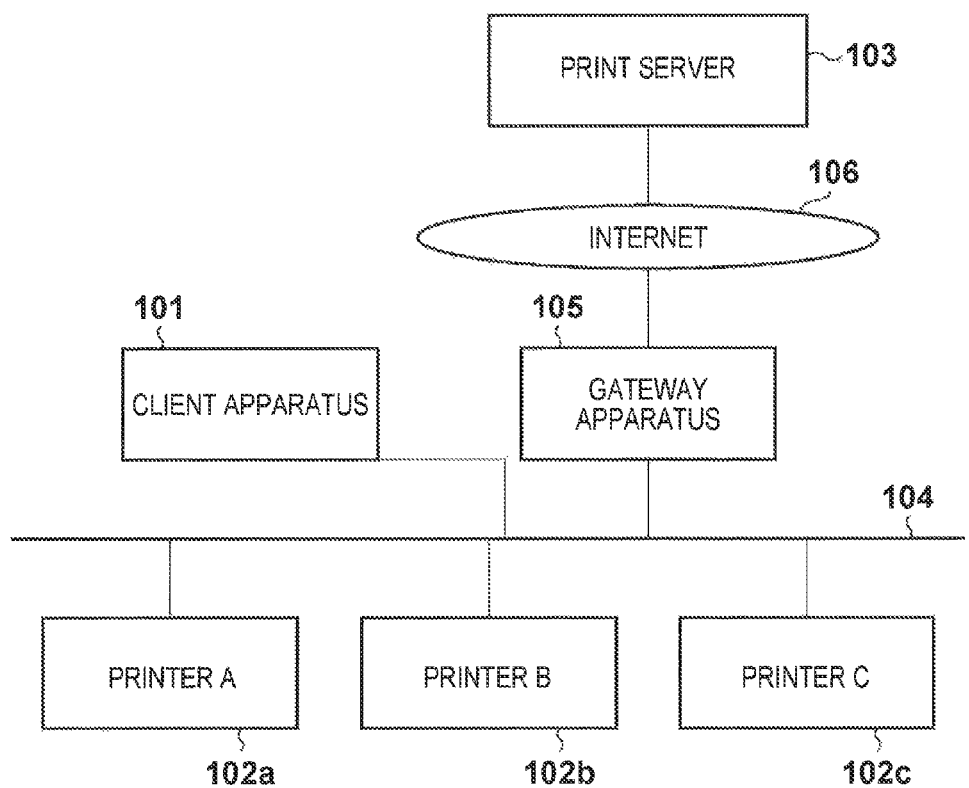
FIG. 1 is a block diagram showing an exemplary configuration of a printing system.

Hereafter, embodiments for carrying out the present invention are described using the drawings. FIG. 1 is a block diagram showing a schematic configuration of a printing system according to an embodiment of the present invention. The printing system of the present embodiment is provided with a client apparatus 101 that is operated by a user and issues print instructions, and a plurality of printers 102 serving as print output destinations. The client apparatus 101 is an information processing apparatus such as a personal computer or a handheld device. The printers 102 may be compound machines, MFPs (Multifunction peripherals) or the like provided with fax, scanner and other functions. Note that in the printing system according the present embodiment, three printers are connected on the network 104. However, the number of printers is not limited thereto. These printers are connected via the network 104 which is an Ethernet (registered trademark) network or the like. The network 104 may be wired or wireless. The client apparatus 101 and a print server 103 are connected through the Internet 106 via a gateway apparatus 105 on the network 104.

Figure 2:
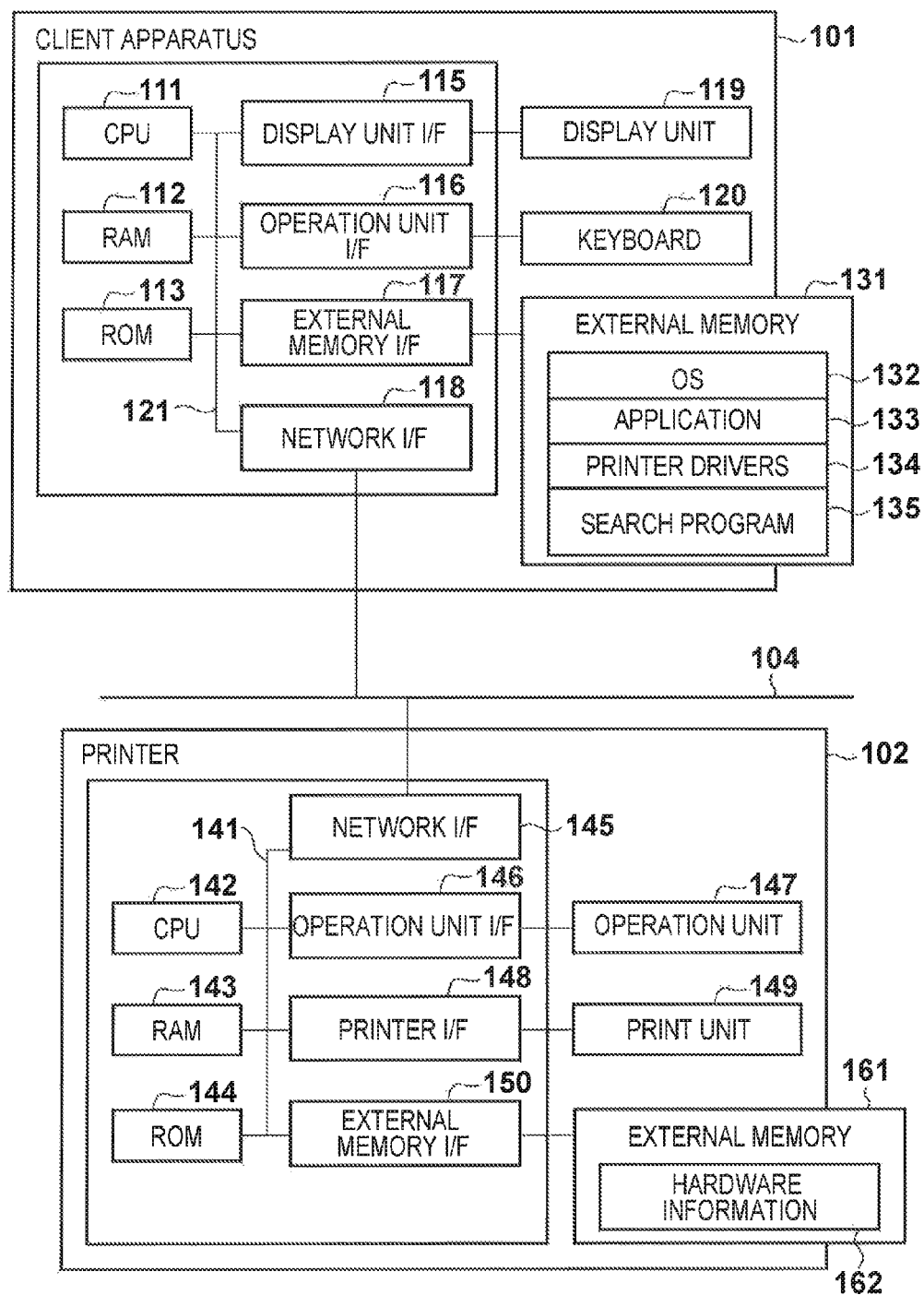
FIG. 2 is a block diagram showing exemplary configurations of devices constituting the printing system.

FIG. 2 is a block diagram showing device configurations of the client apparatus 101 and the printers 102 in FIG. 1. In the client apparatus 101, a CPU 111 performs overall control of devices connected to a system bus 121, in accordance with programs stored in a RAM 112 serving as a storage unit. The RAM 112 functions as a main memory, work area and the like of the CPU 111. A ROM 113 stores various programs and data. An operation unit I/F 116 controls key inputs from a keyboard 120 or a pointing device (touch panel, mouse, etc.; not shown).

A display unit I/F 115 controls display on a display unit 119. An external memory I/F 117 controls access to an external memory 131 such as a flash memory or an SSD (Solid State Drive), for example. The external memory 131 functions as a storage medium for storing an operating system (OS) 132, an application 133 and printer drivers 134 that can be saved thereto and read therefrom by the client apparatus. The printer drivers 134 used here include a local print driver and a print service driver.

A network I/F 118 is a connection I/F with a network, that enables connection to a local network (network 104) and controls data transmission and reception. Note that the present invention is not limited to the configuration in FIG. 2, and the client apparatus 101 may be provided with a second network I/F (not shown) that network connects to a wireless base station by controlling communication with a mobile network or the like, enabling connection to the print server 103. A search program 135 searches for printers connected to the network. Note that in FIG. 2 the search program 135 is stored in the external memory 131, but may be stored in the RAM 112 or the ROM 113 besides the external memory 131.

Next, the configuration of the printer 102 is described using FIG. 2. A CPU 142 controls the entire operations of the printer 102. The CPU 142 performs overall control of devices connected to a system bus 141 in accordance with programs stored in a RAM 143. The RAM 143 functions as a main memory, work area and the like of the CPU 142, and is also used as an input information expansion area and an environment data storage area. This RAM 143 is also provided with an NVRAM (Non-volatile RAM) area, and is configured such that memory capacity can be extended by optional RAM connected to an expansion port (not shown). A ROM 144 stores control programs and the like executed by the CPU 142, various fonts, and various data.

A network I/F 145 controls transmission and reception of data to and from the client apparatus 101 and the print server 103. The network I/F 145 is provided with implementations corresponding to the implementation environment such as Web service protocols. A printer I/F 148 controls the interface with a print unit 149 which is a printer engine. An external memory 161 is, for example, a flash memory, an SSD, or the like, and access thereto is controlled by an external memory I/F 150. The external memory 161 is also capable of storing hardware information 162 according to the present embodiment. Note that in the case where an external memory 161 such as a hard disk is not connected, information and the like used by the client apparatus 101 will be stored in the ROM 144. An operation unit I/F 146 controls the interface with an operation unit 147 for configuring various settings of the printer 102.

The configuration of the print server 103 is illustrated, in FIG. 3. In the print server 103, a CPU 171 performs overall control of devices connected to a system bus 180, in accordance with programs stored in a RAM 172. The RAM 172 also functions as a main memory, work area and the like of the CPU 171. A ROM 173 stores various programs and data. An operation unit I/F 175 controls key inputs from a keyboard 179 or a pointing device (touch panel, mouse, etc.; not shown). A display unit I/F 174 controls display on a display unit 178.

An external memory I/F 176 controls access to an external memory 181 such as a hard disk (HD) or an SSD, for example. The external memory 181 is provided with an OS 182, a web service library 183 and a print service program 184. The external memory 181 further functions as a storage medium that stores user files, edited files and the like that can be saved thereto and read therefrom by a computer (not shown).

The print service program 184 includes a printer registration program 185, a user registration program 186, a print job reception program 187 and a print job transmission program 188 according to the present embodiment. The processing of these programs is discussed later. A rendering program 189 and a database 190 are further included. A network I/F 177 controls communication with the client apparatus 101 and the printers 102 via the Internet 106.

Screen Configuration

Figure 4A:
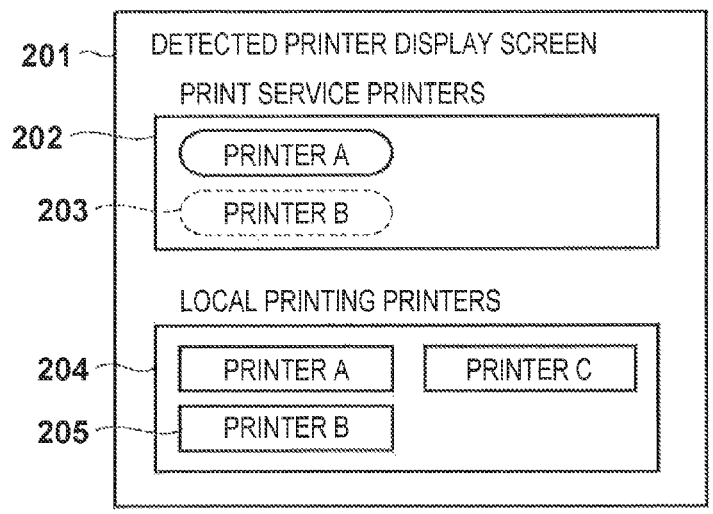
FIGS. 4A, 4B, and 4C are diagrams showing exemplary configurations of display screens on a client apparatus.

FIG. 4A shows an exemplary display screen on the client apparatus 101 displaying a printer search result. A printer search is carried out as a result of the search program 135 for searching for printers being executed at times such as when the client apparatus 101 connects to the network 104 for the first time or when a printer is newly installed on the network 104. The printers 102 detected by the search program 135 are displayed on the display unit 119 of the client apparatus 101 as a display screen 201. Printer information detected by the search program 135 is held in the client apparatus 101. The display screen 201 is constituted by a print service printer display area 202, and a local printing printer display area 204. In the present embodiment, since a printer A 102a, a printer B 102b and a printer C 102c are connected in the printing system as shown in FIG. 1, these printers are detected by the search program 135. In the present embodiment, the printer A 102a and the printer B 102b are assumed to be print service-enabled and local print-enabled. The printer C 102c is assumed to support only local printing.

The search program 135 determines whether the detected printers are print service-enabled and whether they are local print-enabled, and displays the printers in respective areas of the display screen 201 according to the results thereof. In the present embodiment, since the printer A 102a and the printer B 102b, among the detected printers, are provided with the print service-enabled print function, these printers are displayed in the print service printer display area 202. Further, the search program 135 determines whether the print function supporting the print service is operating, and performs display that reveals the operating state by performing different display depending on whether the print function is operating or not operating. For example, in the case where the printer is provided with the print service print function but that function is not operating, a light colored printer icon or the like is used as shown by a printer icon 203. According to the example given here, the printer A 102a is shown to be print-service enabled, and the print function supporting that service is shown to be operating. Also, the printer B 102b is shown to be print service-enabled but the print function supporting that service is shown to be not operating.

On the other hand, in the case where a detected printer is local print-enabled, the printer is displayed in the local printing printer display area 204. In the present embodiment, the printer A 102a, the printer B 102b and the printer C 102c are displayed in the local printing printer display area 204. Further, the search program 135 determines whether the function of local printing is operating, and performs display that reveals the operating state by performing different display depending on whether the function is operating or not operating. Note that according to the example given here, the function of local printing of ail the printers is shown to be operating. The printer icons shown in the print service printer display area 202 may be displayed in a different format, shape or color from the printer icons shown in the local printing printer display area 204. Even with printer icons displayed in the same printer display area, the display method may be distinguished according to the operating state of the print function by differentiating the icons by shape or color. Also, even with icons displayed in different areas, the same display format may be used in the case where the same printer is shown. Also, even if the printer has a specific print function, the icon may be hidden in the case where the print function is not operating, given that the function cannot be utilized.

A feature of the display screen 201 is displaying the printers detected by the search program 135 by dividing the display area or differentiating the shape or color of the icons according to whether or not the printers have the print service function. Even if a single printer has a plurality of print functions, the printer can thereby be easily identified and used as a normal local printing printer or as a print service printer according to the respective print functions.

When a printer icon 203 in the print service printer display area 202 is pressed on the display screen 201, a print service driver for the printer corresponding to that icon is installed on the client apparatus 101. Also, when a printer icon 205 in the local printing printer display area 204 is pressed, a local printing driver for the printer corresponding to that icon is installed. The drivers installed here are downloaded and installed from a printer management server (not shown) or from the selected printer. The printer drivers are then registered in the external memory 131 of the client apparatus 101 as printer drivers 134.

In the case of using a print service-enabled printer driver, the printer driver need only be able to transmit a document, information on the output destination printer and, where necessary, a job ticket to the print server 103. The print service-enabled printer driver can thus be a printer driver provided with a function for issuing a service request to the print server 103, and a plurality of printer drivers corresponding to the models of the output destination printers need not be provided. In addition, a printer driver corresponding to a print service may preliminarily have destination information of the print server 103.

Figure 4B:
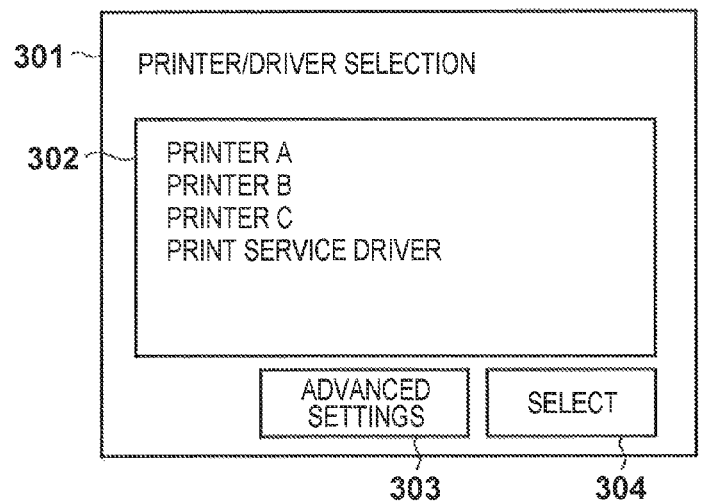

FIG. 4B shows a printer/printer driver selection screen. In the case of utilizing the print service provided by the print server 103, the user selects and activates the print service driver, and instructs the print service driver to access the print server 103. The selection screen 301 is displayed on the display unit 119 of the client apparatus 101, when an instruction to print a document displayed on the display unit 119 is given by the application 133 as a result of a user operation. The selection screen 301 is provided with a selection candidate display area 302, an advanced settings button 303, and a selection button 304. The print service driver is displayed in the selection candidate display area 302 together with output destination printers capable of executing local printing. In the present embodiment, since the printer A 102a, the printer B 102b and the printer C 102c support local printing, these printers are displayed. An output destination printer or the print service driver is designated from the selection candidate display area 302 by a user operation using the keyboard 120, mouse, or the like. The destination of the document is then finalized by the selection button 304 being pressed. When the advanced settings button 303 is pressed, a screen (not shown) for configuring advanced settings related to printing is displayed. Since the advanced settings referred to here are not an important part of the present invention, description is omitted.

Figure 4C:
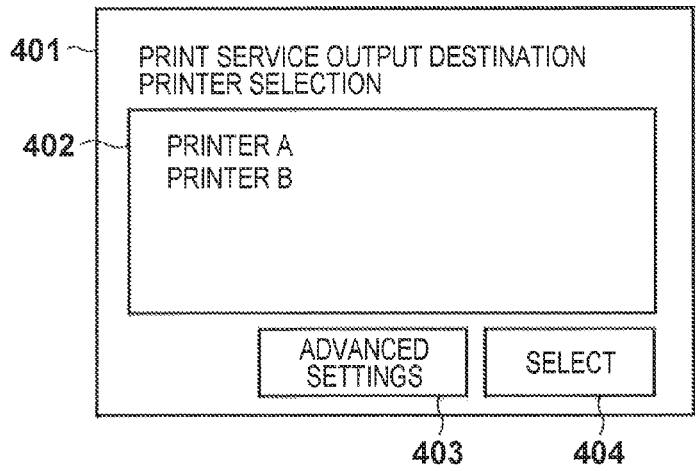

FIG. 4C shows an output destination printer selection screen for when utilizing the print service. This printer selection screen 401 is displayed in the case where the print service driver is selected in FIG. 4B, and there is a print service printer capable of output. The print service printers displayed here, rather than being directly displayed based on printer information detected by the search program 135, are available printers among the print service-enabled printers. Note that the present invention is not limited thereto, and a configuration may be defined in which all print service-enabled printers are displayed but with unavailable printers being unselectable.

When the print service driver is selected on the selection screen 301 in FIG. 4B, the print service driver confirms whether the print service is available. In the confirmation processing of the present embodiment, the activated print service driver performs a first communication check and a second communication check. In the first communication check, the print service driver confirms the connectivity between the client apparatus 101 and the print server 103, and whether the print service printers registered in the client apparatus 101 are registered in the print server 103. This processing is discussed later using FIG. 9. In the second communication check, the print service driver confirms the connectivity between the client apparatus 101 and the print service printers registered in the client apparatus 101. The print service driver further confirms whether the print service-enabled print function is operating in the respective printers, and whether the respective printers are communicable with the print server 103. This processing is discussed later using FIGS. 10A and 10B.

The print service driver, as a result of the first communication check and the second communication check, extracts print service printers that can be used for the print service, and displays the extracted printers in a printer list 402. The printer selection screen 401 is provided with am advanced settings button 403 and a selection button 404 apart from the printer list 402. An output destination printer is designated from the printer list 402 by a user operation using the keyboard 120, mouse or the like, and the destination of the document is finalized by the selection button 404 being pressed. The print service driver transmits the document, printer designation information on the output destination, and a job ticket to the print server 103. As for the transmission instruction by the user, pressing of the selection button 404 may be viewed as a transmission instruction, or it is possible to separately provide a transmission button and issue a transmission instruction. When the advanced, settings button 403 is pressed, a screen (not shown) for configuring advanced settings related to printing is displayed. Note that since the advanced settings referred to here are not an important part of the present invention, description is omitted.

Exemplary Data Configuration

FIGS. 5A to 5D show exemplary configurations of data communicated in the printing system of the present embodiment. FIG. 5A is data relating to device information acquired from printers detected by the search program 135. The search program 135 is used in order for the user to detect printers, at times such as when the client apparatus 101 connects to the network 104 for the first time or when a printer is newly installed on the network 104.

The device information data includes information on a printer name 501, an IP address 502, a local print function 503, a local print state 504, a print service function 505, and a print service state 506. The printer name 501 is information for uniquely identifying the printer. The IP address 502 is information relating to the destination to which the client apparatus 101 or the print server 103 will transmit the print job. The local print function 503 is information showing whether the printer is provided with a function for realizing normal local printing. The local print state 504 is information showing whether the printer is in a state in which local printing can be executed. The print service function 505 is information showing whether the printer is provided with the print function supporting the print service. The print service state 506 is information showing whether the printer is in a state in which printing using the print service can be executed.

FIG. 5B is data that the print service driver acquires from the print server 103 in the first communication check processing discussed later. This data includes a communicability 511 which is information indicating whether the print service driver can communicate with the print server 103. This data also includes a printer registration status 512 which is registration information on each detected printer. The communicability 511 will be communicable if a response is received from the print server 103, and will be incommunicable in the case where the print server 103 is considered to be down when a response is not received for a given time period. If incommunicable, the printer registration status 512 cannot be acquired. The printer registration status 512 is information indicating whether the print service printers that were detected by the search program and whose information is held in the client apparatus 101 are registered and managed as print service printers in the print server 103. In the case where the value of the communicability 511 is "communicable", the print service driver can transmit the printer list that is being held to the print server 103 and request registration confirmation. The contents of the response from the print server 103 will be either "registered" or "unregistered".

FIG. 5C is data that the print service driver acquires from print service printers in the second communication check processing discussed later. The second communication check is processing carried out in order to extract print service printers that are available for the print service, when the print service driver is activated. The data shown in FIG. 5C includes information on a printer operating status 521, a print service function 522, and a server communication status 523.

The printer operating status 521 is information on whether the print service driver is communicable with the print service printer. The print service function 522 is information on whether the function supporting the print service provided in the printer is available. The server communication status 523 is information on whether the print service printer is communicable with the print server 103. The server communication status 523 is information that the print service printer acquires by performing communication confirmation with the print server 103 as the result of a request from the print service driver.

FIG. 5D is print request data (print job) that the print service driver transmits to the print server 103. The print request data includes printer designation information, a document or image to be printed, and a job ticket. The printer designation information includes a printer name 531 and an IP address 532. The information on the document or image to be printed includes a document name 533. The information on the job ticket includes a ticket ID 534.

In the print server 103, print service-enabled printers, model-specific device information and the like are registered in the database 190 by the printer registration program 185. When the print server 103 receives a print job as shown in FIG. 5D, the print job reception program 187 determines the model of the output destination printer using the printer name 531 with reference to the database 190, and acquires model information. The rendering program 189 performs rendering according to the model of the output destination printer, and the print job transmission program 188 transmits the print job to the output destination printer using the IP address 532 or the like. The web service library 183 is used at this time.

Search Processing Flow

FIG. 6 is a flowchart representing the processing of the search program 135 of the client apparatus 101. At times such as when the client apparatus 101 connects to the network 104 for the first time or when a printer is newly installed on the network 104, a printer search is carried out by executing the search program 135 in order for the user to detect printers. The search program 135, although stored in the external memory 131 in FIG. 1, is not limit thereto and may be stored in the RAM 112, the ROM 113, or the like.

When the processing of the search program 135 is started, the search program 135 transmits a printer search packet to the network 104 (S1001). The search program 135 receives a search result (FIG. 5A) from a printer connected to the network 104 in response to the printer search packet (S1002). Information on the functions and operating state relating to the printer connected to the network is thereby collected. Based on the received search result, the search program 135 determines whether the detected printer is provided with the function of a print service printer (S1003). The processing of the search program 135 advances to S1004 if the printer is provided with the print service-enabled function (YES at S1003), and advances to S1007 if the printer is not provided, with the print service-enabled function (NO at S1003).

At S1004, the search program 135 determines whether the print service-enabled function of the detected print service printer is active. If the function is active (YES at S1004), at S1005 the search program 135 holds the information with the detected printer as an available print service printer, and advances to S1007. In the case where the function is inactive (NO at S1004), at S1006 the search program 135 holds the information with the detected printer as a print service printer that is currently unavailable, and advances to S1007.

At S1007, the search program 135 determines whether the detected printer is provided with the function of a local printing printer. The processing of the search program 135 advances to S1008 if the printer is provided with the local print-enabled function (YES at S1007), and advances to S1011 if the printer is not provided with the local print-enabled function (NO at S1007). At S1008 the search program 135 determines whether the local print-enabled function of the detected local printing printer is active. If the function is active (YES at S1008), at S1009 the search program 135 holds information with the detected printer as an available local printing printer, and advances to S1011. If the function is inactive (NO at S1008), at S1010 the search program 135 holds information with the detected printer as a local printing printer that is currently unavailable, and advances to S1011. At S1011 the search program 135 displays the search result (FIG. 4A), and ends the processing. As a result of the search program 135 performing such processing, a single print service-enabled printer can be easily identified and used as a normal local printing printer or as a print service printer.

Search Response Processing Flow

Figure 7:
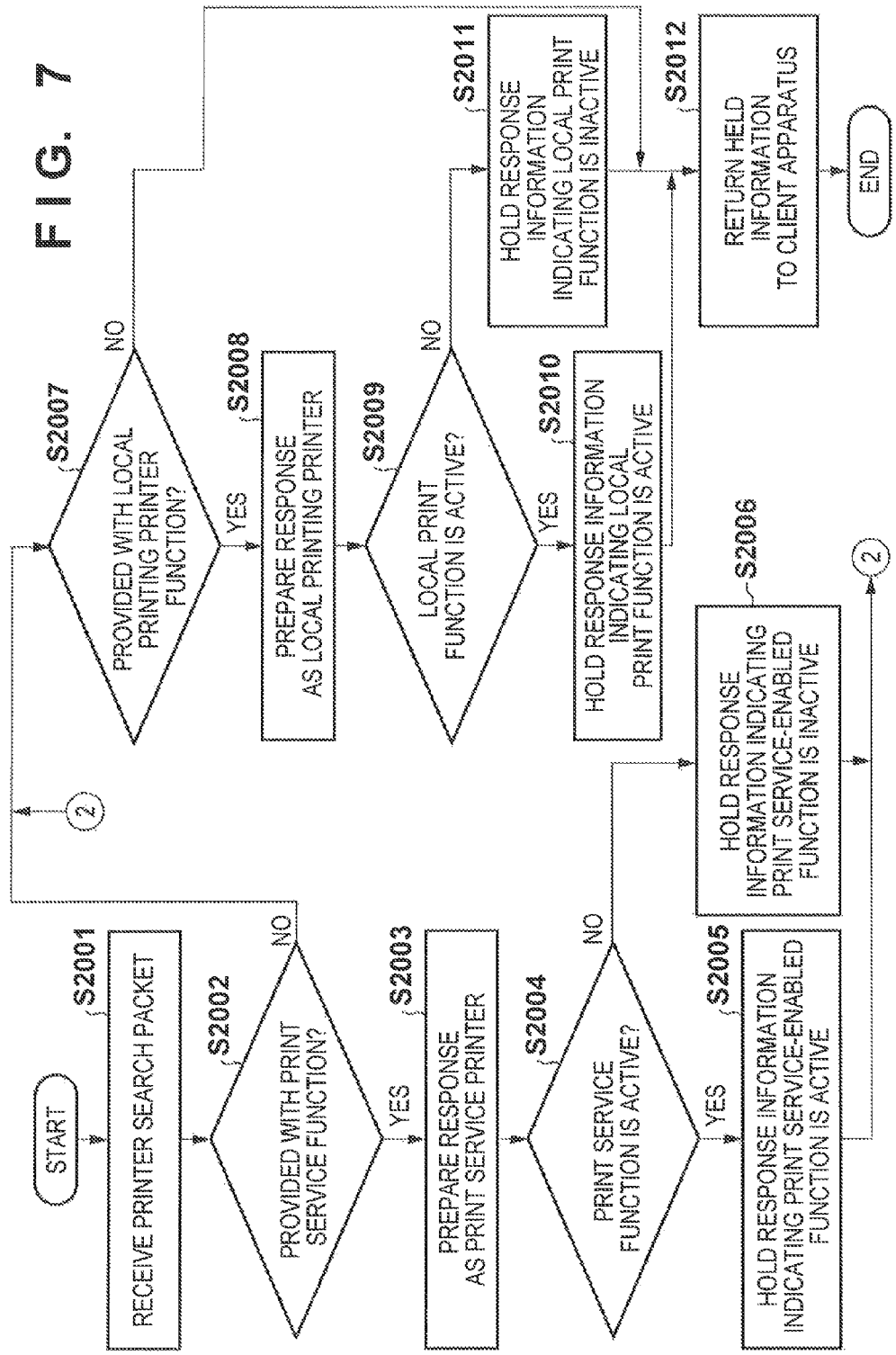
FIG. 7 is a flowchart showing the processing of a printer responding to a search.

FIG. 7 is a flowchart representing the processing of a printer responding to a search. This is the response processing of a printer 102 to the inquiry by the search program 135 of the client apparatus 101 shown in FIG. 6. In the present embodiment, this processing is realized by the CPU 142 of the printer 102 reading out a corresponding program stored in the storage unit and executing the read program. Note that, in the present embodiment, an exemplary configuration is shown in which three printers consisting of the printer A 102a, the printer B 102b and the printer C 102c are connected to the network, with the functions of each printer being as discussed above.

A printer 102, on receiving a printer search packet transmitted from the search program 135 (S2001), determines whether it is itself provided with the function supporting the print service (S2002). The processing of the printer 102 advances to S2003 if it is provided with that function (YES at S2002), and advances to S2007 if it is not provided with that function (NO at S2002). At S2003, the printer 102 prepares a response as a print service printer, and advances to S2004. At S2004, the printer 102 determines whether the function supporting the print service is active. If the function is active (YES at S2004), at S2005 the printer 102 holds response information indicating that the print service-enabled function is active, and advances to S2007. If the function is inactive (NO at S2004), at S2006 the printer 102 holds response information indicating that the print service-enabled function is inactive, and advances to S2007.

At S2007 the printer 102 determines whether it is itself provided with the function supporting local printing. If it is provided with the function supporting local printing (YES at S2007), the printer 102 at S2008 holds response information indicating that it is a local printing printer, and advances to S2009. The printer advances to S2012 if the function supporting local printing is not provided with the function supporting local printing (NO at S2007). At S2009 the printer 102 determines whether the local print-enabled function is active. If the function is active (YES at S2009), at S2010 the printer 102 holds response information indicating that the function of local printing is active, and advances to S2012. If the function is inactive (NO at S2009), at S2011 the printer holds response information indicating that the function of local printing is inactive, and advances to S2012. At S2012, the printer 102 transmits the held response information to the client apparatus 101, and ends the processing. Note that the information relating to whether the printer has the print service-enabled function may be stored, in the external memory 161 by function addition or the like, or may be stored in the ROM 144 as a factory-installed function.

Three examples are shown as exemplary methods of response by a printer 102 connected to the network 104. The first example is a response method that involves returning one response respectively indicating whether the printer supports local printing and whether the printer supports the print service. Specifically, when a response (FIG. 5A) is received from a printer 102, the search program 135 of the client apparatus 101 determines from this one response whether the printer supports local printing and whether the printer supports the print service.

The second example is a response method that involves returning one response including only information indicating that the print service is supported, in the case where the printer supports the print service. Specifically, when a response is received from a printer, the search program 135 of the client apparatus 101 takes it as obvious that the printer has the local print function. Based on the received response, the search program 135 then determines whether the printer supports the print service. Even in the case where it is assumed that the printer has the local print function, however, if the local print function is inactive, the printer 102 needs to return inactive information to the search program 135. Based on this inactive information, the search program 135 determines that the local print function in the printer is inactive.

The third example is a response method that involves separately preparing responses respectively indicating whether the printer supports local printing and whether the printer supports the print service, and the printer returning two responses. Specifically, the search program 135 of the client apparatus 101 performs processing after receiving the responses, ensuring not to disregard, the second response after receiving one response. If for some reason, however, the first response received is the response as a print service printer, the second response received will be the response as a local printing printer. Thus, if it is taken as obvious that the printer supports local printing in the case where the response as a print service printer is received first, the second response received may be disregarded.

Processing Flow of Print Service Driver

Figure 8A:
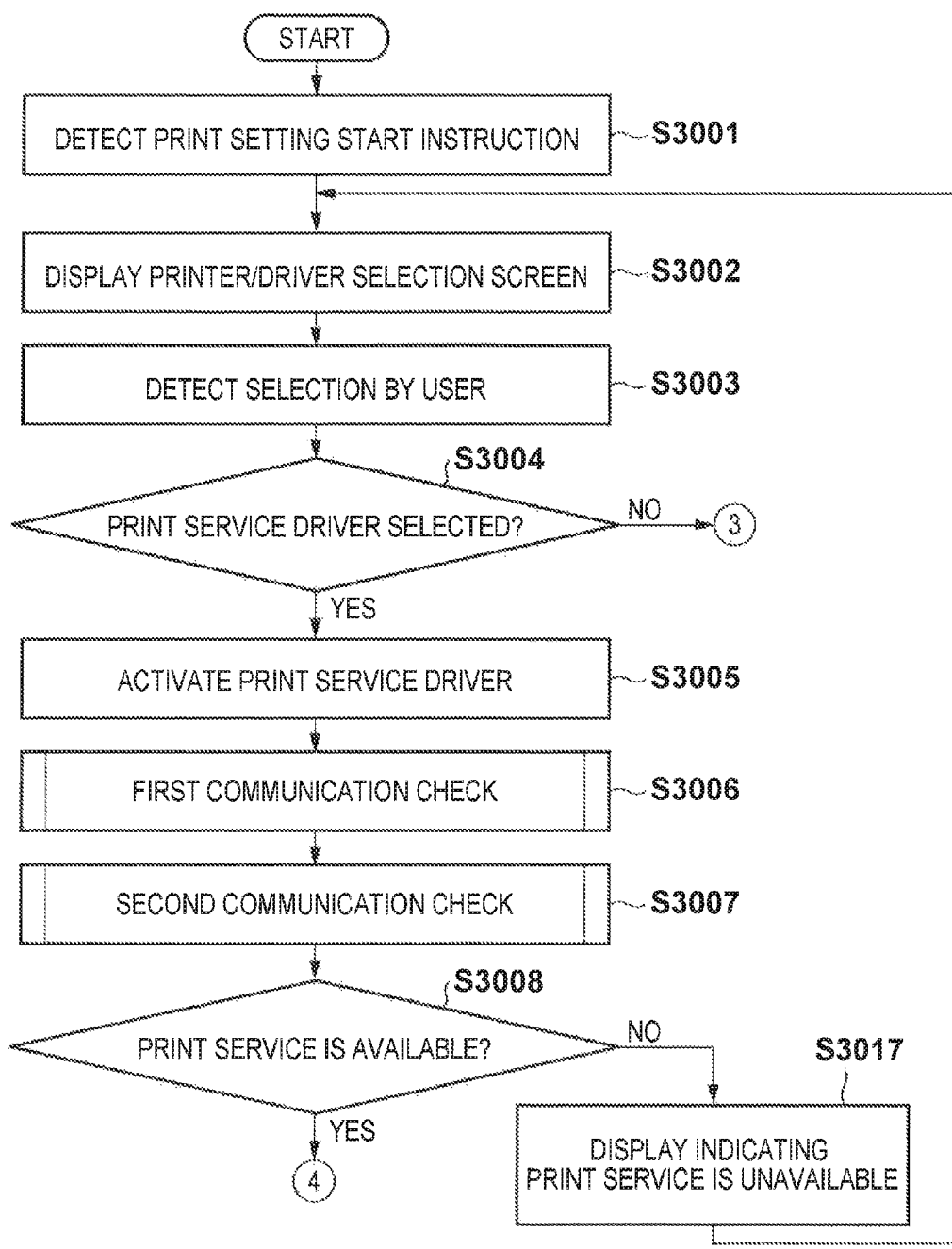
FIGS. 8A and 8B are flowcharts showing the processing of a print service driver.
Figure 8B:
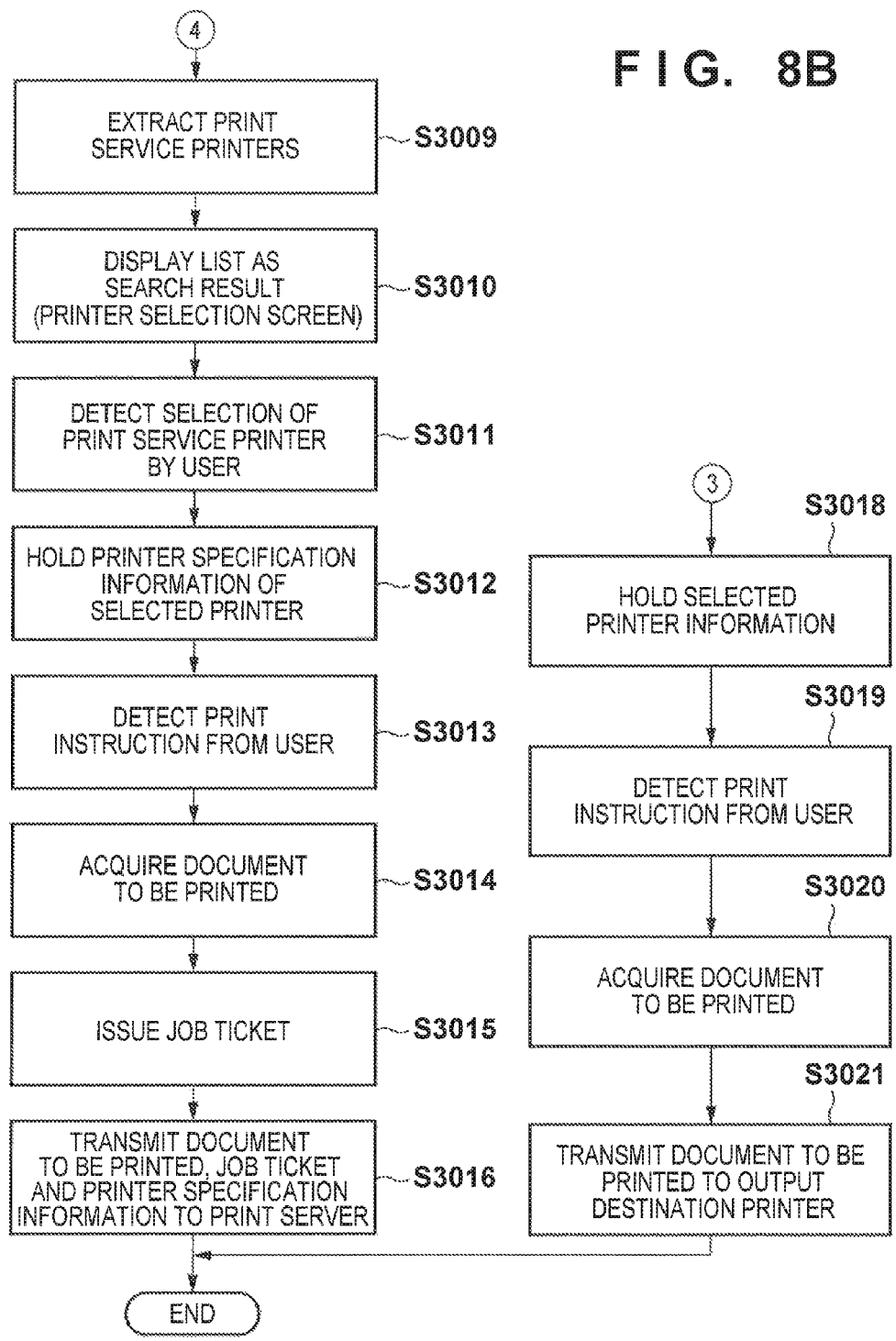

FIGS. 8A and 8B are flowcharts representing the processing of the print service driver. This processing is executed by the CPU 111 reading out the printer driver 134 stored in the external memory 131.

As a result of a print request from the application 133 on the client apparatus 101, the printer driver 134 detects a print setting start instruction (S3001). At S3007 the printer driver 134 displays a printer and driver selection screen 301 such as shown in FIG. 4B. When a selection by the user is detected (S3003), the printer driver 134 determines whether the print service driver was selected (S3004). If the print service driver was selected (YES at S3004), the printer driver advances to S3005. If the print service driver was not selected (NO at S3004), the printer driver advances to S3018.

At S3005 the printer driver 134 operates the print service driver. At S3006 the print service driver performs the first communication check. In the first communication check, connectivity with the print server 103 is confirmed. Further, the print service driver confirms whether the print service printers registered in the client apparatus 101 are registered in the print server 103. The details of this processing are discussed later using FIG. 9. At S3007 the print service driver performs the second communication check. In the second communication check, connectivity with the print service printers registered in the client apparatus 101 is confirmed. It is further confirmed whether the print service-enabled print function is operating, and whether the printers are communicable with the print server 103. The details of this processing are discussed later using FIGS. 10A and 10B.

At S3008 the print service driver determines whether the print service is available, as a result of the first communication check and the second communication check. If the print service is available using the print service driver (YES at S3008) the print service driver advances to S3009. If the print service is not available (NO at S3008) the print service driver advances to S3017. At S3009 the print service driver extracts print service printers. At S3010 the print service driver then displays a list (FIG. 4C) of the extracted print service printers as the search result. The print service driver, on detecting selection of a print service printer by the user (S3011), holds printer specification information on the printer selected as the output destination for the print service (S3012). Thereafter, the print service driver, on detecting a print instruction resulting from a user operation (S3013), acquires a document or image to be printed (S3014), and issues a corresponding job ticket (S3015). The print service driver then transmits the printer specification information, the document to be printed and the job ticket to the print server 103.

On the other hand, if, as a result of the printer search, a printer provided with the function for the print service could not be detected (NO at S3008), the fact that the print service driver could not detect a print service printer is displayed on the display unit 119 (S3017). The printer driver then stops the processing of the print service driver, and returns to the processing of S3002. Display which does not include the print service driver as a selection option is performed on the printer and driver selection screen 301 of FIG. 4B displayed at S3002 after transitioning from S3017, and only the printers serving as output destinations for local printing are displayed in the selection candidate display area 302. In this case, because the print service driver cannot be selected in the processing of S3003, the determination of S3004 will result in the printer driver transitioning to S3018.

In the processing of S3018, the printer driver 134 holds information on the printer for local printing selected by the user. The printer driver 134, on detecting a document print instruction resulting from a user operation (S3013), acquires the document to be printed (S3020). The printer driver 134 then transmits the acquired document to be printed to the output destination local printing printer designated by the user (S3021), and ends the processing. In using the print service, the print service driver performs the first communication check and the second communication check. This enables only print service printers that are actually able to realize the print service to be selected and used.

Note that in the present embodiment, when the print server 103 receives a print job, the print job reception program 187 determines the model of the output destination printer using the printer name 531 with reference to the database 190, and acquires model information. The rendering program 189 performs rendering according to the model of the output destination printer, and the print job transmission program 188 transmits the print job to the output destination printer using the IF address 532 or the like. The web service library 183 is used at this time.

The job ticket issued by the print service driver is notified or displayed to the user. The print service printer performs output processing when input of a ticket ID is detected.

If only one printer is extracted at S3009, the processing of S3010 and S3011 may be omitted, and information on the one printer may be held at S3012.

First Communication Check

FIG. 9 is a flowchart representing the processing of the first communication check by the print service driver. This processing is executed by the CPU 111 of the client apparatus 101 reading out a program. Note that a first confirmation unit is realized by this processing.

At S3031, the print service driver acquires address information of the print server 103 that is managed by the client apparatus 101. At S3032 the print service driver transmits a communication check packet to the print server 103, and received a response thereto at S3033. At S3034 the print service driver then determines whether communication with the print server 103 is possible based on the received response. For example, if a response could not be received within a predetermined time period, it may be determined that communication is not possible. If communication is possible (YES at S3034), the print service driver advances to S3035. If communication is not possible (NO at S3034), the print service driver advances to S3040.

At S3035 the print service driver acquires a printer list. This printer list is a list of print service printers that were detected by the search program 135 and are being held. In the present embodiment, since a printer list is used in processing by the print service driver, a copy of that list is used. The print service driver transmits the printer list to the print server 103, and requests confirmation of whether the printers on the printer list are registered for use in the print service (S3036).

The print service driver receives a printer registration status from the print server 103 (S3037), and determines whether any of the printers are unavailable for the print service (S3038). If any of the print service printers are unavailable for the print service (YES at S3038), the print service driver updates the printer list (S3039), and ends the processing. If the printer list does not need updating, or in other words, if all the printers are registered (NO at S3038), the print service driver holds the printer list without change and ends the processing. Also, if communication with the print server 103 is not possible (NO at S3034), the print service driver holds incommunicable information as the communicability 511 (S3040), and ends the processing.

Second Communication Check

Figure 10A:
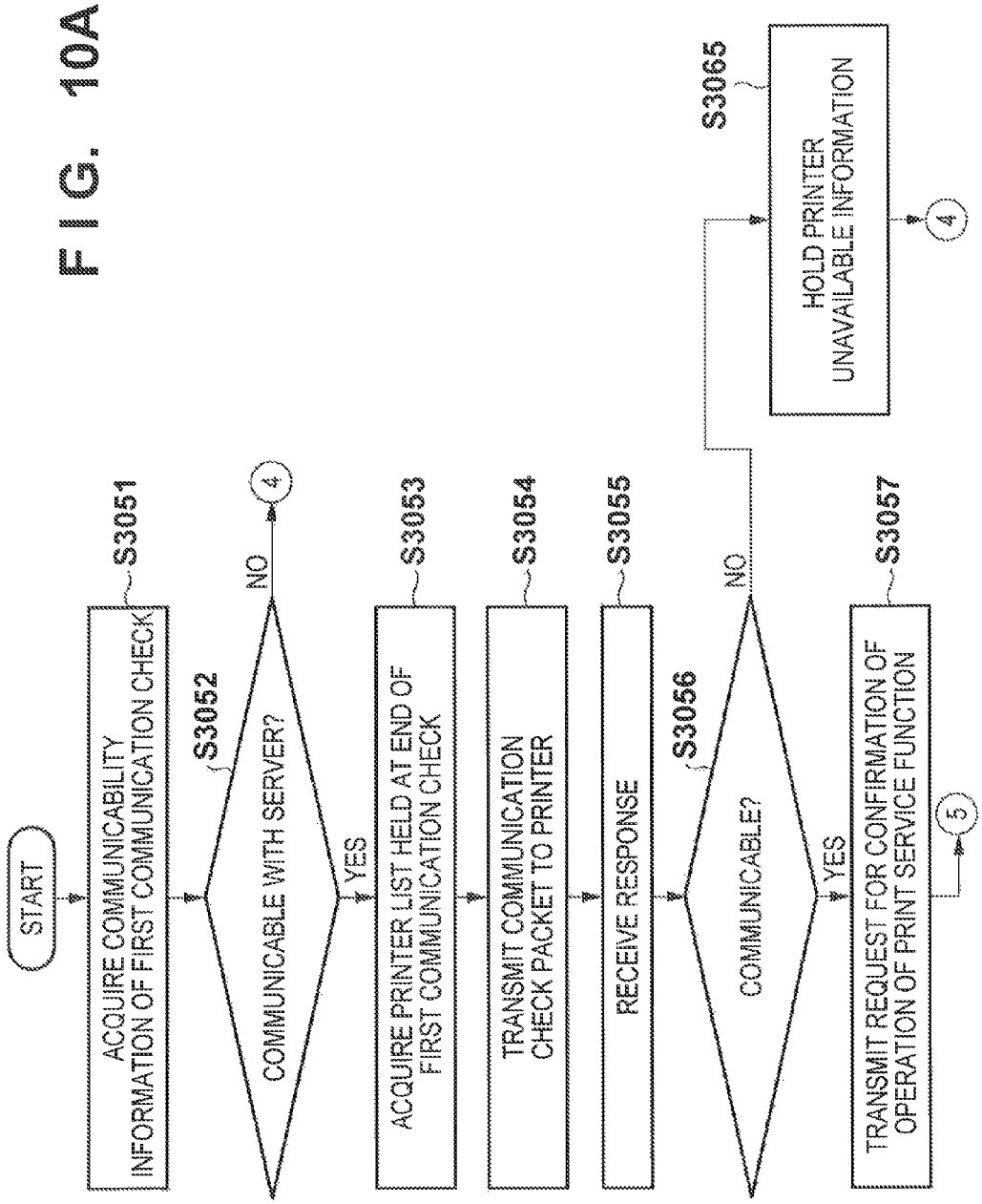

FIGS. 10A and 10B are flowcharts representing the processing of the second communication check by the print service driver. This processing is realized by the CPU 111 of the client apparatus 101 reading out a program. Note that a second confirmation unit is realized by this processing.

The print service driver acquires the communicability 511 of the first communication check (S3051). At S3052 the print service driver determines whether communication with the print server 103 is possible, based on the communicability 511. If communication is possible (YES at S3052) the print service driver advances to S3053. If communication is not possible (NO at S3052) the print service driver advances to S3067. At S3053 the print service driver acquires the printer list held at the end of the first communication check. At S3054 the print service driver transmits a communication check packet to the print service printers recorded in the printer list. The print service driver, on receiving a response to the communication check packet from a print service printer (S3055), determines whether communication with the print service printer is possible based on the received response (S3056). For example, if a response could not received within a prescribed time period, it may be determined that communication is not possible.

If communication is possible (YES at S3056) the print service driver advances to S3057. If communication is not possible (NO at S3056) the print service driver advances to S3065. At S3057 the print service driver requests confirmation of operation of the function supporting the print service in the print service printers with which communication is possible. The print service driver, on receiving a response from a print service printer (S3058), then determines at S3059 whether the function supporting the print service is operating, based on the response received. If the function is operating (YES at S3059) the print service driver advances to S3060. If the function is not operating (NO at S3059) the print service driver advances to S3066.

At S3060 the print service driver acquires address information of the print server 103. At S3061, the print service driver attaches the address information to a request to the print service printers to perform a communication check with the print server 103. The print service driver, on receiving response information from the printers that were requested to perform the communication check (S3062), determines at S3063 whether any of the print service printers are incommunicable with the print server 103 based on the response information received. The communication result between the print server 103 and the print service printer is shown by the information of the server communication status 523 shown in FIG. 5C. If any of the print service printers cannot communicate (YES at S3063), at S3064 the print service driver updates the printer list, and ends the processing. If there are no print service printers that cannot communicate (NO at S3063), the print service driver holds the printer list without change, and ends the processing.

On the other hand, at S3065 the print service driver holds information indicating that the printer is "not operating" in the operating status 521 of the print service printer shown in FIG. 5C, and advances to S3067. Also, at S3066 the print service driver holds information indicating that the printer is "not operating" in the print service function 522 shown in FIG. 5C, that is, information indicating "inactive" and advances to S3067. At S3067 the print service driver holds information, updated by S3065, S3066 or the like, indicating that, the print service is unavailable, and ends the processing.

As a result of the above, the user is able to easily identify and use a single printer as a local printing printer or as a print service printer. Also, when a user uses the print service, print service printers that are actually able to realize the print service are clearly indicated, enabling the user to use print functions easily with reference to the display.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium, of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-052120, filed Mar. 9, 2011, which is hereby incorporated by reference herein in its entirety.

What is claimed is:

1. An information processing apparatus that is connectable via a network to a print server and a printer having at least one function of local printing and print server-mediated printing, comprising:
    a search unit configured to search for a printer connected to the network;
    a receiving unit configured to receive device information from the printer detected by the search unit, wherein the device information describes a function which the printer has;
    a determination unit configured to perform a determination about whether the printer detected by the search unit has a function of the print server-mediated printing and a determination about whether the printer detected by the search unit has a function of the local printing, based on the device information received by the receiving unit; and
    a display unit configured to display a selection screen having a printer list,
    wherein a printer, which has two functions including the function of the print server-mediated printing and the function of the local printing, is included in the printer list,
    wherein one printer which has the two functions can be selected via the selection screen as a printer which prints using either the function of the print server-mediated printing or the function of the local printing, and
    wherein the printer, which has the two functions including the function of the print server-mediated printing and the function of the local printing, is displayed on the selection screen so that a user can identify that the printer has the two functions.

2. The information processing apparatus according to claim 1, further comprising a collection unit configured to collect information relating to a state of a function of the printer detected by the search unit,
    wherein the display unit displays the information relating to the state of the function collected by the collection unit, in association with each function of the printer.

3. The information processing apparatus according to claim 2, wherein the information collected by the collection unit includes information indicating whether the function of the local printing is provided, information indicating whether the function of the print server-mediated printing is provided, an operating state of the function of the local printing, and an operating state of the function of the print server-mediated printing.

4. The information processing apparatus according to claim 1, wherein the display unit performs display on the selection screen in respectively different display formats or different display areas for each state of functions of the printer.

5. The information processing apparatus according to claim 1 further comprising:
    a first confirmation unit configured to confirm a communicability of the information processing apparatus with the print server;
    an extraction unit configured to extract, from among printers detected by the search unit, a printer that has the function of the print server-mediated printing and is registered in the print server;
    a second confirmation unit configured to confirm a communicability of the printer extracted by the extraction unit with the information processing apparatus and the print server; and a specification unit configured to specify a printer which is capable of communication with the information processing apparatus and the print server and in which the function of the print server-mediated printing is operating, wherein the display unit displays, on the selection screen, the printer specified by the specification unit as a printer that is capable of the function of print server-mediated printing.

6. The information processing apparatus according to claim 5, wherein the display unit hides or displays, on the selection screen, as unavailable for use by a user, the printer specified by the specification unit as a printer which is not capable of communication or in which the function of the print server-mediated printing is not operating.

7. A control method of an information processing apparatus that is connectable via a network to a print server and a printer having at least one function of local printing and print server-mediated printing, comprising:

searching for a printer connected to the network;

receiving device information from the printer detected in the search step, wherein the device information describes a function which the printer has;

performing a determination about whether the printer detected in the search step has a function of the print server-mediated printing and a determination about whether the printer detected in the search step has a function of the local printing, based on the device information received in the receiving step; and displaying a selection screen having a printer list, wherein a printer, which has two functions including the function of the print server-mediated printing and the function of the local printing, is included in the printer list, wherein one printer which has the two functions can be selected via the selection screen as a printer which prints using either the function of the print server-mediated printing or the function of the local printing, and wherein the printer, which has the two functions including the function of the print server-mediated printing and the function of the local printing, is displayed on the selection screen so that a user can identify that the printer has the two functions.

8. A non-transitory computer-readable medium storing a program for causing a computer to function as:

a search unit configured to search for a printer connected to a network;

a receiving unit configured to receive device information from the printer detected by the search unit, wherein the device information describes a function which the printer has;

a determination unit configured to perform a determination about whether the printer detected by the search unit has a function of print server-mediated printing and a determination about whether the printer detected by the search unit has a function of local printing, based on the device information received by the receiving unit; and a display unit configured to display a selection screen having a printer list, wherein a printer, which has two functions including the function of the print server-mediated printing and the function of the local printing, is included in the printer list, wherein one printer which has the two functions can be selected via the selection screen as a printer which prints using either the function of the print server-mediated printing or the function of the local printing, and wherein the printer, which has the two functions including the function of the print server-mediated printing and the function of the local printing, is displayed on the selection screen so that a user can identify that the printer has the two functions.

* * * * *